United States Patent
Shearer

(10) Patent No.: US 11,018,490 B2
(45) Date of Patent: May 25, 2021

(54) FAULT INTERRUPT MODULE

(71) Applicant: Goodrich Corporation, Charlotte, NC (US)

(72) Inventor: Jon Shearer, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 241 days.

(21) Appl. No.: 16/246,710

(22) Filed: Jan. 14, 2019

(65) Prior Publication Data

US 2019/0245338 A1 Aug. 8, 2019

Related U.S. Application Data

(60) Provisional application No. 62/627,365, filed on Feb. 7, 2018.

(51) Int. Cl.
| | | |
|---|---|---|
| *H02H 3/00* | (2006.01) | |
| *H02H 1/04* | (2006.01) | |
| *H02H 1/00* | (2006.01) | |
| *H02H 3/32* | (2006.01) | |
| *B64D 11/00* | (2006.01) | |
| *H02H 3/02* | (2006.01) | |
| *F24D 13/02* | (2006.01) | |
| *H02H 3/027* | (2006.01) | |
| *H02H 3/07* | (2006.01) | |
| *H02H 3/33* | (2006.01) | |

(52) U.S. Cl.
CPC ............. *H02H 1/04* (2013.01); *B64D 11/00* (2013.01); *F24D 13/02* (2013.01); *H02H 1/0007* (2013.01); *H02H 3/021* (2013.01); *H02H 3/027* (2013.01); *H02H 3/07* (2013.01); *H02H 3/32* (2013.01); *H02H 3/33* (2013.01)

(58) Field of Classification Search
None
See application file for complete search history.

(56) References Cited

U.S. PATENT DOCUMENTS

| | | | |
|---|---|---|---|
| 4,084,204 A | 4/1978 | Jacobus, Jr. | |
| 4,376,243 A | 3/1983 | Renn et al. | |
| 5,835,322 A | 11/1998 | Smith et al. | |
| 5,940,256 A * | 8/1999 | MacKenzie | H02H 1/0015 361/42 |
| 7,408,750 B2 | 8/2008 | Pellon et al. | |

(Continued)

FOREIGN PATENT DOCUMENTS

| | | |
|---|---|---|
| EP | 1164678 A2 | 12/2001 |
| EP | 2005110445 A | 4/2005 |
| EP | 1569314 A1 | 8/2005 |

OTHER PUBLICATIONS

Extended European Search Report for EP Application No. 19156068.9, dated Jul. 8, 2019, pp. 8.

*Primary Examiner* — Stephen W Jackson
(74) *Attorney, Agent, or Firm* — Kinney & Lange, P. A.

(57) ABSTRACT

A fault interrupt module includes a detector circuit, a counter circuit, and a switch circuit. The detector circuit is configured to detect faults as a difference in current between an input power line and a neutral line. The counter circuit configured to increment a fault count each time a fault is detected by the detector circuit, and the switch circuit is configured to terminate power to a load upon the fault count reaching a threshold count within a threshold time period.

17 Claims, 6 Drawing Sheets

(56) References Cited

U.S. PATENT DOCUMENTS 7,557,330 B2 *  7/2009  Shearer .............. F24D 19/1096
                                                    219/532
9,374,076 B2 *  6/2016  Klug, Jr. ................ H03K 17/78

* cited by examiner

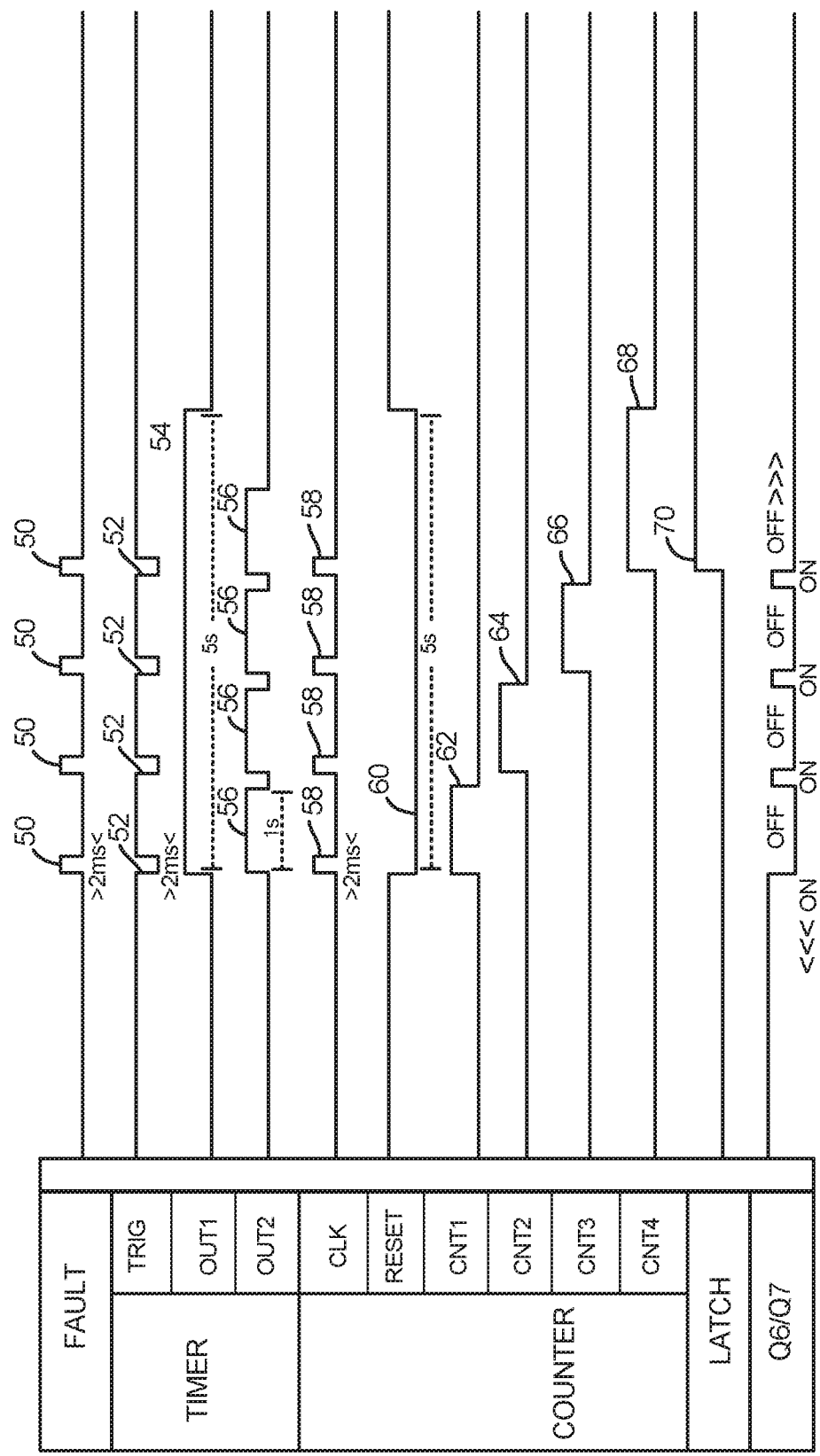

FAULT INTERRUPT MODULE

CROSS-REFERENCE TO RELATED APPLICATION(S)

This application claims the benefit of U.S. Provisional Application No. 62/627,365 filed Feb. 7, 2018 for "FAULT INTERRUPT MODULE" by J. Shearer.

BACKGROUND

The present invention relates generally to fault detection, and in particular to a system and method for detecting and handling electrical faults.

An aircraft will commonly include heated floor panels (HFPs) in order to help maintain the cabin at a comfortable temperature. An aircraft HFP is usually made by compiling a series of layers together to form a lower support layer and a heater layer. The heater layer may include, for example, a resistance element disposed in layers of a thermosettable dielectric material. The resistance element within the heated floor panel typically receives alternating current (AC) power from an AC power source included in the aircraft. Current provided to the resistance element causes the resistance element to generate heat, thereby heating the floor panel.

A conventional interrupt circuit cannot function properly on an HFP due to the inherent capacitance that results from the makeup of the HFP. A conventional ground fault interrupt circuit, for example, will fault due to reactive current which flows from the heater elements to the skin of the HFP when the HFP is energized by 115 VAC, 400 Hz power. It is desirable to design a fault interrupt circuit that allows for some reactive current while still detecting and handling dielectric breakdown within the HFP.

SUMMARY

A fault interrupt module includes a detector circuit, a counter circuit, and a switch circuit. The detector circuit is configured to detect faults as a difference in current between an input power line and a neutral line. The counter circuit configured to increment a fault count each time a fault is detected by the detector circuit, and the switch circuit is configured to terminate power to a load upon the fault count reaching a threshold count within a threshold time period.

A method of controlling input power to a load includes detecting, by a detector circuit, faults on the input power; outputting, by a detector circuit, a detector pulse upon detection of each of the faults; incrementing, by a counter circuit, a fault count upon receipt of the detector pulse; and terminating, by a switch circuit, the input power upon the fault count reaching a threshold count within a threshold time period.

A circuit configured to control input power to a load includes an input coil, a detector circuit, a counter circuit, and a solid state relay circuit. The input coil is configured to output a difference in current between an input line that carries the input power and a neutral return line. The detector circuit is configured to output a detector pulse when the difference in current is greater than a threshold value. The counter circuit is configured to increment a fault count each time the detector circuit outputs the detector pulse, and the solid state relay circuit is configured to terminate power to the load upon the fault count reaching a threshold count.

BRIEF DESCRIPTION OF THE DRAWINGS

FIG. 3A-3B are waveforms illustrating signals within a fault interrupt circuit.

DETAILED DESCRIPTION

A fault interrupt module is disclosed herein for detecting and handling power faults in loads. The fault interrupt module is configured to monitor the input power to a load to detect faults. For example, the fault interrupt module may compare an input power line to a neutral return line and if the difference in current is greater than a threshold value, a fault may be indicated. By setting a threshold value, the fault interrupt module is capable of permitting some reactive current in the load. The fault interrupt module may terminate power to the load for a short time upon each occurrence of a fault. If a threshold number of consecutive faults occur, the fault interrupt module may terminate power to the load indefinitely. In this way, the fault interrupt module is capable of preventing minor fluctuations or other faults in the input power from falsely terminating power to the load.

Figure 1:
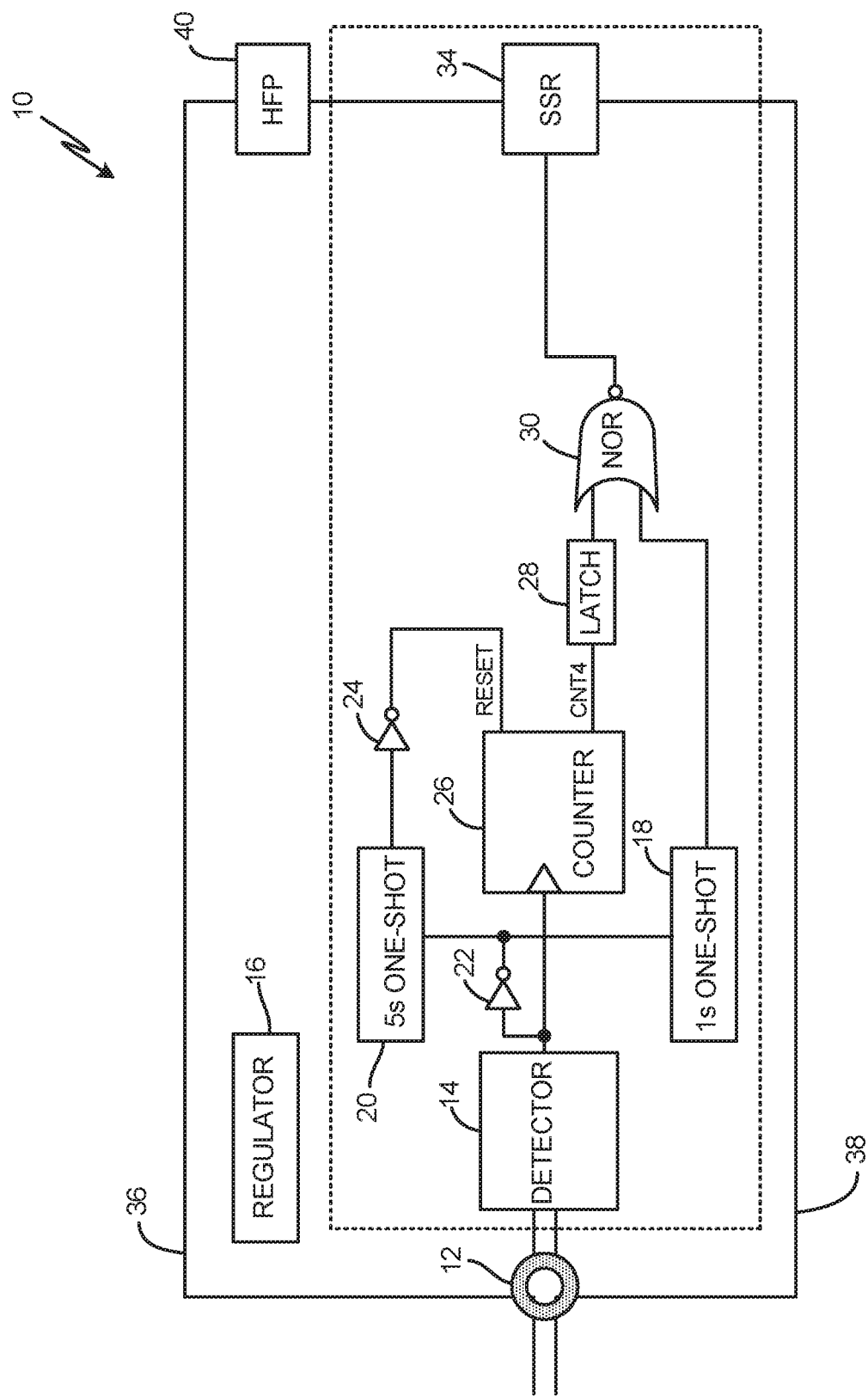
FIG. 1 is a block diagram illustrating a fault interrupt module.

FIG. 1 is a block diagram illustrating fault interrupt module 10. Fault interrupt module 10 includes input coil 12, detector circuit 14, regulator circuit 16, timer circuits 18 and 20, inverters 22 and 24, counter circuit 26, latch 28, NOR circuit 30, and solid state relay circuit 34. AC input power line 36 and neutral line 38 are provided to input coil 12. Power is controlled by fault interrupt module 10 from power input line 36 to heated floor panel (HFP) 40. While illustrated and described as a heated floor panel, HFP 40 may be any load for which it is desirable to detect faults while permitting some reactive current.

HFP 40 or another load may have some expected reactive current loss. For example, HFPs are often resistive loads with large capacitive coupling to airframe ground, resulting in some expected reactive current loss. The difference in current between input power line 36 and neutral line 38 may be measured by detector circuit 14 to determine the reactive current loss. In one embodiment, the power on AC input power line 36 may be 115V, 400 Hz, AC power. However, fault interrupt module 10 can handle a wide variation in frequency. If the reactive current loss is greater than a threshold value, detector circuit 14 may output a detected fault pulse. In one embodiment, the threshold value may be 110 mA, but may be set to any desirable value of current based on the needs of the system.

The fault detected pulse is provided to both inverter 22 and counter circuit 26. The output of inverter 22 is provided to timer circuits 18 and 20. In an embodiment, timer circuit 18 may be a monostable, one second, one-shot timer and timer circuit 20 may be a monostable, five second, one-shot timer. Timer circuits 18 and 20 may each be implemented using 555 timers, for example. While described below with timer circuit 18 outputting a one second pulse and timer circuit 20 outputting a five second pulse, other time periods may be implemented. For example, timer circuit 20 may output a four second pulse and timer circuit 18 may output a 500 millisecond pulse.

Counter circuit 26 is configured to increment each time a pulse is received from detector circuit 14. Illustrated in FIG. 1 is a reset input and count output (CNT4). While illustrated as having a clock input, a reset input, and a count output (CNT4), counter circuit 26 may include further inputs and/or outputs that are not shown. Counter circuit 26 may be implemented as a decade counter, for example. The output of timer circuit 20 is provided, through inverter 24, to the reset input of counter circuit 26. Thus, the count of counter circuit 26 is reset each time the five second time period expires. The output (CNT4) is indicative of the count of counter circuit 26 reaching four. In other embodiments, a different threshold count, more or less than four, may be utilized. Thus, the output (CNT4) is indicative of four consecutive faults being detected within the five second pulse output by timer 20.

Once the output (CNT4) goes high to indicate four faults were detected with the five second interval, latch 28 latches the output (CNT4). This indicates that a fault has been detected and that power should be terminated to HFP 40 indefinitely. This fault may be indicative of a dielectric breakdown within HFP 40, or some other fault that increased the reactive current loss. The output of latch 28 is provided to NOR gate 30. NOR gate 30 is used to control the input to solid state relay circuit 34. Solid state relay circuit 34 is a switch circuit that controls the flow of power to HFP 40. Solid state relay circuit 34, for example, may include one or more metal-oxide-semiconductor field-effect transistors (MOSFETs) and/or any other type of switch.

When the output of NOR gate 30 is high, solid state relay circuit 34 permits power flow to HFP 40. The output of timer circuit 18 and the output of latch 28 are provided to NOR gate 30. Thus, the output of NOR gate 30 is high when timer circuit 18 is not outputting a timer pulse, and latch circuit 26 has not latched a fault. Power is therefore permitted to flow to HFP 40 any time an initial fault has not been detected and a fault has not been latched.

Upon detection of a fault by detector circuit 14, solid state relay 34 terminates power via the output of timer circuit 18. This process may take approximately two milliseconds to complete. Once power is terminated to HFP 40, a fault will no longer be detected, and thus, detector circuit 14 will no longer produce a fault pulse. Therefore, the fault pulse from detector circuit 14 may be approximately two milliseconds in duration. Solid state relay circuit 34 continues to block power flow to HFP 40 for the duration of the timer pulse from timer 18. Upon completion of the timer pulse from timer 18, if no fault has been latched by latch 28, solid state relay 34 will reconnect power to HFP 40. At this time, if a fault is still present in HFP 40, detector circuit 14 will once again output a fault pulse. If four fault pulses are detected within the five second pulse of timer 20, counter circuit 26 outputs (CNT4) the pulse to latch 28 and power is terminated to HFP 40 indefinitely.

Figure 2A:
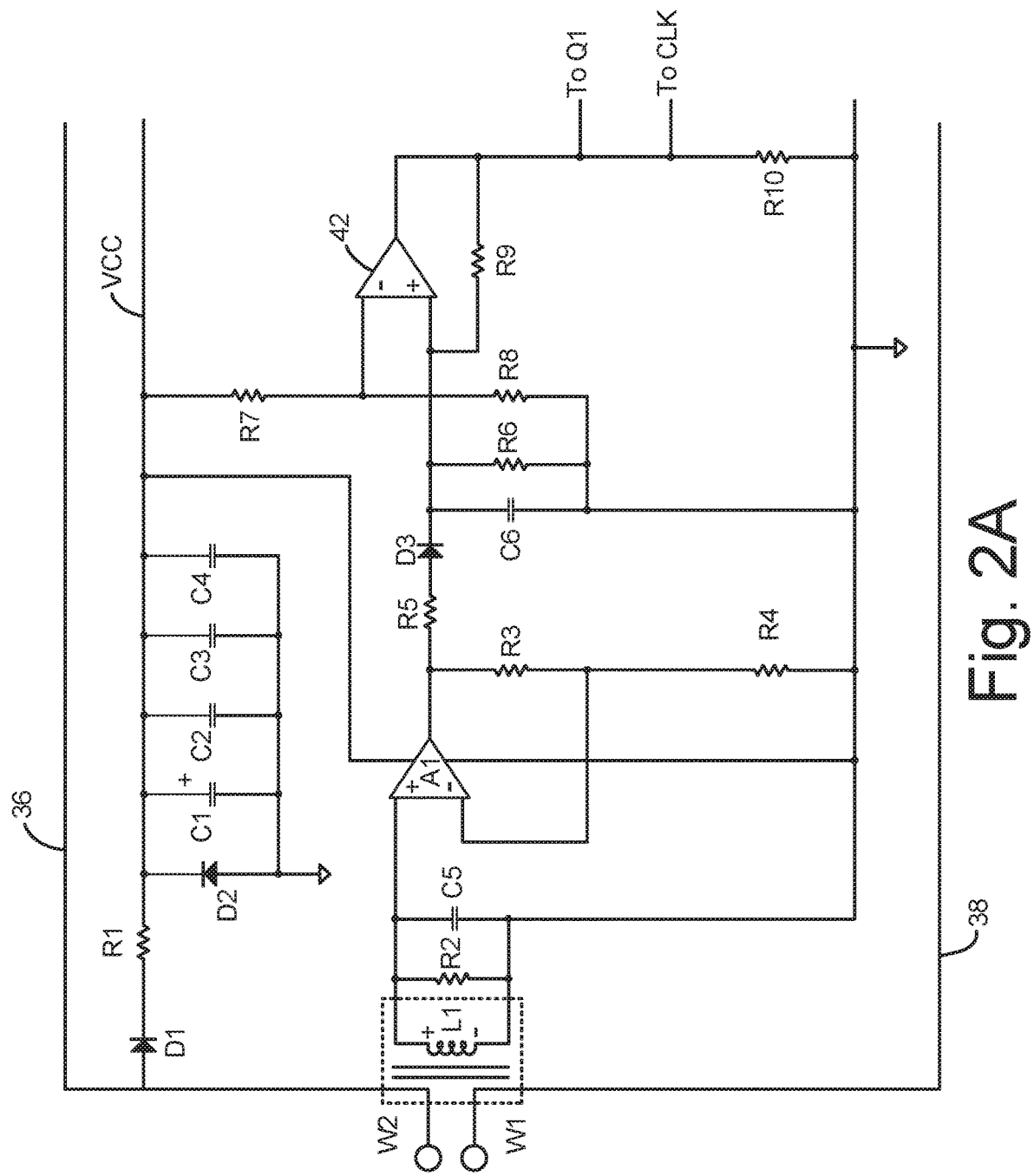
FIG. 2A-2C are circuit diagrams illustrating an example embodiment of a fault interrupt circuit.
Figure 2B:
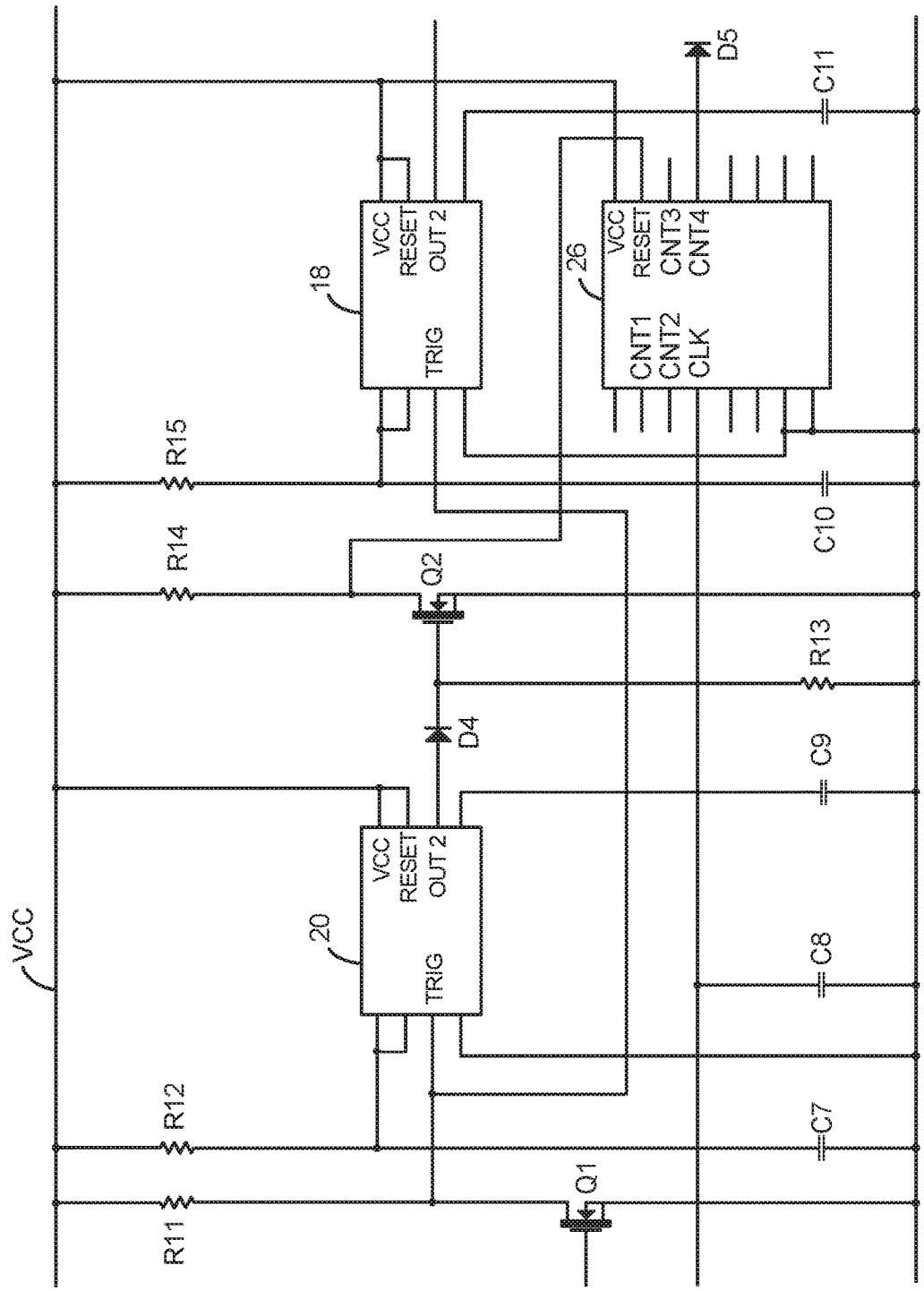
Figure 2C:
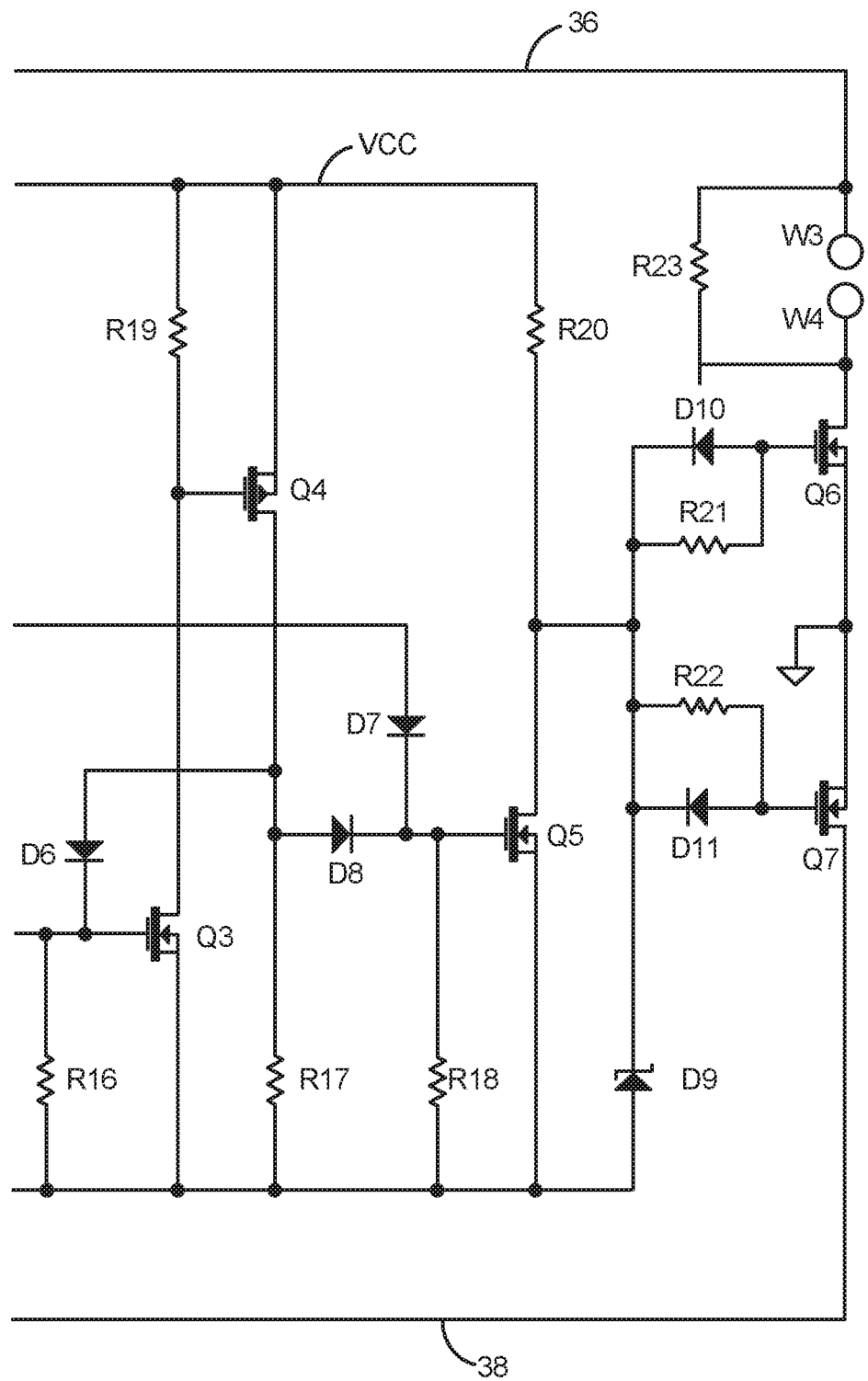

FIGS. 2A-2C are circuit diagrams illustrating an example implementation of the fault interrupt module 10 illustrated in FIG. 1. While FIGS. 2A-2C illustrate one example implementation, fault interrupt module 10 may be implemented in other ways. FIG. 2A is a circuit diagram that illustrates input coil 12, detector circuit 14, and regulator circuit 16. Regulator circuit 16 includes diodes D1 and D2, resistor R1, and capacitors C1-C4. The regulator circuit receives input power, such as 115V AC power from an aircraft power bus, for example, on terminal W2. Regulator circuit 16 rectifies the AC power and provides, for example, 12 V DC power on line VCC.

Input wire 36, which carries the input AC power, and neutral return line 38, run through the center of input coil L1. When an imbalance in the current occurs, which may be indicative of a fault, a voltage is induced in coil L1 across resistor R2 and capacitor C5. In an embodiment, input coil L1 may have a current-to-voltage ratio (at 400 Hz, RMS values) of 100 mA to approximately 88 mV. This voltage is then amplified through a non-inverting amplifier that includes operational amplifier A1, and resistors R3 and R4. The output of the differential amplifier is based on the values of R3, R4, and the input voltage from coil L1.

The output of the differential amplifier is passed through resistor R5 and diode D3, which half rectifies the amplified signal, and the peak value is stored on capacitor C6. The peak value is held by the resistor-capacitor (RC) circuit that includes capacitor C3 and resistor R6. The stored peak value is then compared to a reference voltage, which may be set using a voltage divider that includes resistors R7 and R8. In one embodiment, the reference voltage may be set as approximately 4 V, which may correspond to an approximately 110 mA offset in input coil L1. Thus, the output of comparator 42 is low when no fault is detected, and pulses high when the fault is detected. Resistor R9 may be placed as positive feedback for hysteresis to eliminate any noise on the signal from providing a false detection.

FIG. 2B is a circuit diagram that illustrates example embodiments for timer circuits 18 and 20, and counter circuit 26. The output from comparator 42 may be a short 12 V pulse, which may be ideal for clocking counter 26. In order to trigger timers 18 and 20, the pulse from comparator 42 must be inverted. The pulse is applied to the gate of logic field-effect transistor (FET) Q1. Resistor R10 is a pull-down resistor for FET Q1. R11 is a pull-up resistor, which when used with FET Q1, creates the inverted pulse used to trigger timers 18 and 20.

Resistor R12 and capacitor C7 are used to generate the five second pulse from timer 20, which is used to drive the RESET pin on counter 26. The output of timer 20 is a 12 V pulse. However, in the present embodiment, the RESET pin of counter 26 may be activated with a low pulse. Thus, FET Q2 and resistor R14 are used as an inverter. The inverted trigger is also provided to timer 18. Timer 18 works in a similar manner as timer 20. Thus, R15 and C7 are used to set the pulse width of timer 18, which may be one second in the present embodiment.

Counter circuit 26, which may be a decade counter, is clocked using the non-inverted pulse from comparator 42. As long as the RESET pin is held low by the output pulse of timer 20, counter 26 will advance one output (CNT1, CNT2, CNT3, CNT4) every time a pulse is received from comparator 42. If four consecutive faults are reached before the RESET pin is pulled high again, CNT4 is activated which activates latch 28.

FIG. 2C is a circuit diagram illustrating an example embodiment for latch 28, NOR gate 30, and solid state relay circuit 34 of FIG. 1. CNT4 provides voltage when the fourth fault is detected. This turns on FET Q3, which pulls the gate of FET Q4 (a P-channel FET) negative. This turns on FET Q4, which in turns applies voltage across diode D6, keeping FET Q3 activated. The voltage on diode D8 is at VCC potential after FET Q4 is turned on, which holds solid state relay circuit 34 in the OFF state, terminating power from HFP 40, which is connected to terminals W3 and W4.

Figure 3B:
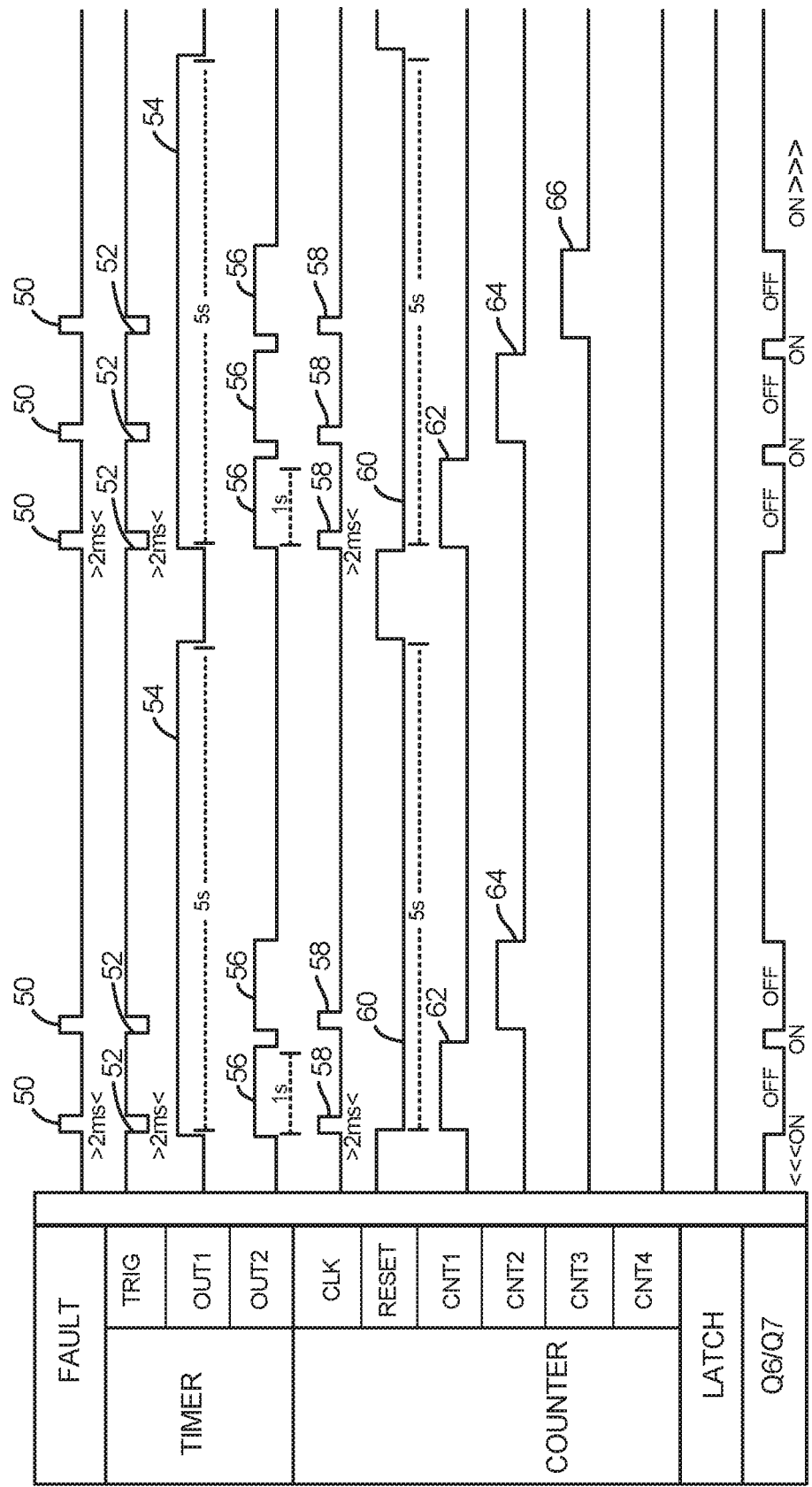

FIGS. 3A and 3B are waveforms illustrating signals within fault interrupt module 10. FIG. 3A is a waveform that illustrates detection and handling of a fault that results in termination of power to HFP 40 indefinitely. The FAULT signal is the output of detector circuit 14 of FIG. 1. Each pulse 50 on the FAULT signal is indicative of an initial fault detected, which indicates an imbalance in current between input line 36 and neutral line 38. The TRIG signal is the FAULT signal inverted, which is provided to timers 18 and 20. OUT1 is the output of five second timer 20, and OUT2 is the output of one second timer 18. The inverted pulses 52 are provided to both timers 18 and 20. Upon receiving the inverted pulses 52, timer 20 begins a five second pulse 54, and timer 18 begins a one second pulse 56.

The CLK signal is an input to counter 26, and is the same signal as the FAULT signal, and the RESET signal is an input to counter 26, and is an inverted copy of the OUT1 signal. When a five second pulse 54 begins, RESET signal 60 goes low, allowing counter 26 to progress from zero. Each time a pulse 58 is seen at the CLK input, while RESET signal 60 is low, counter 26 increments such that a respective output (CNT1, CNT2, CNT3, CNT4) of counter 26 goes high. When the first increment occurs, CNT1 signal 62 goes high. When the second increment occurs, CNT2 signal 64 goes high. When the third increment occurs, CNT3 signal 66 goes high, and when the fourth increment occurs, CNT4 signal 68 goes high. When CNT4 signal 68 goes high, latch 28 latches the CNT4 signal 68 and the LATCH signal transitions, and stays, high. Q6/Q7 represents the state of solid state relay circuit 34. When either OUT2 signal 56 is high, or LATCH signal 70 is high, solid state relay circuit 34 is OFF. In all other situations, solid state relay circuit 34 is ON, permitting power to flow to HFP 40.

FIG. 3B is a waveform that illustrates nuisance faults that do not result in a fault being latched. As seen, two fault pulses 50 are initially output on the FAULT signal. This triggers the five second timer to output the five second pulse 54. During the five second pulse 54, two faults are detected and thus, CNT2 goes high, but CNT4 never goes high within the five second pulse. At the end of the five second pulse 54, the RESET signal 60 goes high, resetting counter 26 back to zero. Following the reset, another series of faults are detected, resulting in three pulses 50. The five second timer is once again initiated resulting in another five second pulse 54. Because three faults occur during the five second pulse, CNT3 goes high, but CNT4 does not go high within the five second pulse. Thus, CNT4 never goes high and no signal is latched. Therefore, Q6/Q7 returns to the ON state and HFP 40 continues receiving power.

As seen in the above description, fault interrupt module 10 is capable of handling faults in loads that expect some reactive current loss, without the need for software. This reduces the size and weight of the circuit. Module 10 permits some reactive current and is also capable of handling nuisance faults without permanently tripping power to HFP 40. Module 10 is capable of interfacing with any aircraft heated floor panel or other load, and can handle a wide variation in power frequency. While described as using five second and one second time periods, and a count threshold of four, any other time periods and counts may be implemented that allow fault interrupt module 10 to provide a delay that allows for nuisance faults to clear and for fault interrupt module 10 to reset and begin counting faults again.

Discussion of Possible Embodiments

The following are non-exclusive descriptions of possible embodiments of the present invention.

A fault interrupt module includes a detector circuit, a counter circuit, and a switch circuit. The detector circuit is configured to detect faults as a difference in current between an input power line and a neutral line. The counter circuit configured to increment a fault count each time a fault is detected by the detector circuit, and the switch circuit is configured to terminate power to a load upon the fault count reaching a threshold count within a threshold time period.

The fault interrupt module of the preceding paragraph can optionally include, additionally and/or alternatively, any one or more of the following features, configurations and/or additional components:

A further embodiment of the foregoing fault interrupt module, further including first and second timers. The first timer is configured to output a first pulse for a first time period upon receipt of the detector pulse, and the second timer configured to output a second pulse for a second time period upon receipt of the detector pulse, wherein the threshold time period is the second time period.

A further embodiment of any of the foregoing fault interrupt modules, wherein the second time period is greater than the first time period.

A further embodiment of any of the foregoing fault interrupt modules, wherein the switch circuit is further configured to terminate the power to the load during the first pulse.

A further embodiment of any of the foregoing fault interrupt modules, wherein the counter circuit is configured to output a counter pulse upon the fault count reaching the threshold count within the second time period.

A further embodiment of any of the foregoing fault interrupt modules, further including a latch configured to latch the counter pulse to maintain the switch circuit in an OFF state.

A further embodiment of any of the foregoing fault interrupt modules, wherein the load is an aircraft heated floor panel.

A method of controlling input power to a load includes detecting, by a detector circuit, faults on the input power; outputting, by a detector circuit, a detector pulse upon detection of each of the faults; incrementing, by a counter circuit, a fault count upon receipt of the detector pulse; and terminating, by a switch circuit, the input power upon the fault count reaching a threshold count within a threshold time period.

The method of the preceding paragraph can optionally include, additionally and/or alternatively, any one or more of the following features, configurations and/or additional components:

A further embodiment of the foregoing method, wherein detecting, by the detector circuit, the faults on the input power includes detecting a difference in current between an input power line and a neutral line.

A further embodiment of any of the foregoing methods, further including outputting, by a first timer circuit, a first pulse upon receipt of the detector pulse; and terminating, by the switch circuit, the input power during the first pulse.

A further embodiment of any of the foregoing methods, further including outputting, by a second timer circuit, a second pulse, greater than the first pulse, as the threshold time period upon receipt of the detector pulse.

A further embodiment of any of the foregoing methods, wherein the method further includes outputting, by the counter circuit, a counter pulse if the fault count reaches the threshold count within the second pulse.

A further embodiment of any of the foregoing methods, further including latching the counter pulse as a latched signal; and providing the latched signal to the switch circuit, wherein the switch circuit is configured to terminate the input power based on the latched signal.

A further embodiment of any of the foregoing methods, wherein the input power is alternating current (AC) power and the load is a heated floor panel for an aircraft.

A circuit configured to control input power to a load includes an input coil, a detector circuit, a counter circuit, and a solid state relay circuit. The input coil is configured to output a difference in current between an input line that carries the input power and a neutral return line. The detector circuit is configured to output a detector pulse when the difference in current is greater than a threshold value. The counter circuit is configured to increment a fault count each time the detector circuit outputs the detector pulse, and the solid state relay circuit is configured to terminate power to the load upon the fault count reaching a threshold count.

The circuit of the preceding paragraph can optionally include, additionally and/or alternatively, any one or more of the following features, configurations and/or additional components:

A further embodiment of the foregoing circuit, further including a first timer configured to output a first pulse for a first time period upon receipt of the detector pulse, and a second timer configured to output a second pulse for a second time period upon receipt of the detector pulse.

A further embodiment of any of the foregoing circuits, wherein the second time period is greater than the first time period.

A further embodiment of any of the foregoing circuits, wherein the solid state relay circuit is further configured to terminate the power to the load during the first pulse.

A further embodiment of any of the foregoing circuits, wherein the counter circuit is configured to output a counter pulse upon the fault count reaching threshold count within the second time period.

A further embodiment of any of the foregoing circuits, further including a latch configured to latch the counter pulse to maintain the solid state relay in an OFF state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fault interrupt module comprising:
    a detector circuit configured to detect faults as a difference in current between an input power line and a neutral line;
    a counter circuit configured to increment a fault count each time a fault is detected by the detector circuit;
    a switch circuit configured to terminate power to a load upon the fault count reaching a threshold count within a threshold time period;
    a first timer configured to output a first pulse for a first time period upon receipt of the detector pulse; and
    a second timer configured to output a second pulse for a second time period upon receipt of the detector pulse, wherein the threshold time period is the second time period.

2. The fault interrupt module of claim 1, wherein the second time period is greater than the first time period.

3. The fault interrupt module of claim 1, wherein the switch circuit is further configured to terminate the power to the load during the first pulse.

4. The fault interrupt module of claim 1, wherein the counter circuit is configured to output a counter pulse upon the fault count reaching the threshold count within the second time period.

5. The fault interrupt module of claim 4, further comprising a latch configured to latch the counter pulse to maintain the switch circuit in an OFF state.

6. The fault interrupt module of claim 1, wherein the load is an aircraft heated floor panel.

7. A method of controlling input power to a load, the method comprising:
    detecting, by a detector circuit, faults on the input power;
    outputting, by a detector circuit, a detector pulse upon detection of each of the faults;
    incrementing, by a counter circuit, a fault count upon receipt of the detector pulse;
    terminating, by a switch circuit, the input power upon the fault count reaching a threshold count within a threshold time period;
    outputting, by a first timer circuit, a first pulse upon receipt of the detector pulse; and
    terminating, by the switch circuit, the input power during the first pulse.

8. The method of claim 7, wherein detecting, by the detector circuit, the faults on the input power comprises detecting a difference in current between an input power line and a neutral line.

9. The method of claim 7, further comprising:
    outputting, by a second timer circuit, a second pulse, greater than the first pulse, as the threshold time period upon receipt of the detector pulse.

10. The method of claim 9, and wherein the method further comprises:
    outputting, by the counter circuit, a counter pulse if the fault count reaches the threshold count within the second pulse.

11. The method of claim 10, further comprising:
    latching the counter pulse as a latched signal; and
    providing the latched signal to the switch circuit, wherein the switch circuit is configured to terminate the input power based on the latched signal.

12. The method of claim 7, wherein the input power is alternating current (AC) power and the load is a heated floor panel for an aircraft.

13. A circuit configured to control input power to a load, the circuit comprising:
    an input coil configured to output a difference in current between an input line that carries the input power and a neutral return line;
    a detector circuit configured to output a detector pulse when the difference in current is greater than a threshold value;
    a counter circuit configured to increment a fault count each time the detector circuit outputs the detector pulse;
    a solid state relay circuit configured to terminate power to the load upon the fault count reaching a threshold count;
    a first timer configured to output a first pulse for a first time period upon receipt of the detector pulse; and
    a second timer configured to output a second pulse for a second time period upon receipt of the detector pulse.

14. The circuit of claim 13, wherein the second time period is greater than the first time period.

15. The circuit of claim 13, wherein the solid state relay circuit is further configured to terminate the power to the load during the first pulse.

16. The circuit of claim 13, wherein the counter circuit is configured to output a counter pulse upon the fault count reaching the threshold count within the second time period.

17. The circuit of claim 16, further comprising a latch configured to latch the counter pulse to maintain the solid state relay in an OFF state.

\* \* \* \* \*